(12) United States Patent
Seshadri et al.

(10) Patent No.: US 12,537,786 B2
(45) Date of Patent: Jan. 27, 2026

(54) USE OF ARTIFICIAL INTELLIGENCE TECHNIQUES TO IDENTIFY POSSIBLE INADVERTENT DATA DISCLOSURES IN EMAILS

(71) Applicant: STATE STREET BANK AND TRUST COMPANY, Boston, MA (US)

(72) Inventors: Anand Seshadri, Chennai (IN); Dushyant Ralhan, Littleton, MA (US); Gubo Huang, Hangzhou (CN); Yuan Fang, Hangzhou (CN)

(73) Assignee: STATE STREET BANK AND TRUST COMPANY, Boston, MA (US)

( * ) Notice: Subject to any disclaimer, the term of this patent is extended or adjusted under 35 U.S.C. 154(b) by 0 days.

(21) Appl. No.: 18/336,517

(22) Filed: Jun. 16, 2023

(65) Prior Publication Data
US 2024/0422114 A1   Dec. 19, 2024

(51) Int. Cl.
*H04L 51/212* (2022.01)
*H04L 9/40* (2022.01)

(52) U.S. Cl.
CPC ........ *H04L 51/212* (2022.05); *H04L 63/0263* (2013.01); *H04L 63/20* (2013.01)

(58) Field of Classification Search
CPC ... H04L 51/212; H04L 63/0263; H04L 63/20; H04L 41/026
See application file for complete search history.

(56) References Cited

U.S. PATENT DOCUMENTS

| | | | |
|---|---|---|---|
| 2007/0192474 A1* | 8/2007 | Decasper | H04L 67/306 709/223 |
| 2013/0304742 A1* | 11/2013 | Roman | H04L 51/212 707/740 |
| 2016/0226808 A1* | 8/2016 | Lin | H04L 51/214 |
| 2020/0396190 A1* | 12/2020 | Pickman | H04L 67/306 |
| 2021/0058395 A1* | 2/2021 | Jakobsson | H04L 67/306 |
| 2021/0157950 A1* | 5/2021 | Turano | G06F 21/6245 |
| 2023/0239303 A1* | 7/2023 | Hutelmyer | H04L 63/1425 726/4 |
| 2024/0121262 A1* | 4/2024 | Gill | H04L 63/0263 |

\* cited by examiner

*Primary Examiner* — Meng Vang
(74) *Attorney, Agent, or Firm* — GOODWIN PROCTER LLP

(57) ABSTRACT

Exemplary embodiments may employ artificial intelligence models to identify outbound emails (e.g., those directed to recipients that are outside an organization, a business unit or other partition of an organization) that are at risk of containing IDDs. The identified emails may be automatically blocked and/or may be forwarded to a reviewer for further scrutiny and/or remediation. The reviewer may review the emails and determine whether the emails should be blocked from being sent and/or whether the email should be remediated. The identified emails may be returned to their senders or associated business unit or organization, and the senders or remediating parties may modify the emails and attempt to send out the modified emails.

18 Claims, 21 Drawing Sheets

| Alert Category | Descriptions |
|---|---|
| Un-whitelist Recipient | Recipient not exists in Client DB |
| Recipient Client Mismatch | Sensitive term information mapped to Client A, Email Recipient not match to Client-A's whitelist |
| Recipient Client Mismatch – Low Risk | Refer to the one above, but involves low risk terms |
| Multiple Clients | Email include sensitive information from Multiple Client |
| Multiple Clients – Low Risk | Refer to the one above, but involves low risk terms |
| No Whitelist Entry for Sensitive Term | Sensitive Term exist in Client DB, but there's no Whitelist Entry from either Client DB or fund list |
| No Sensitive Information Detected | No Sensitive Information Detected in Email |
| GEMS Fund Not Found in Client DB | GEMS Fund Detected in email, but there's no entry of the fund information in Client DB/Fund List. |
| Additional Information Mismatch | Recipient Name/report Name/attachment Name in email Mismatch Client DB entry |

Figure 6C

USE OF ARTIFICIAL INTELLIGENCE TECHNIQUES TO IDENTIFY POSSIBLE INADVERTENT DATA DISCLOSURES IN EMAILS

BACKGROUND

Inadvertent data disclosure (IDD) refers to when confidential or sensitive information is inadvertently disclosed in a communication. Outbound emails destined to external recipients from an organization like a business may be a substantial source of IDDs. For instance, an incorrect attachment that is not the intended attachment may be sent in an outbound email from the organization such that the sending of the email results in an IDD. IDDs may also occur when the attachment is not properly secured, such as via encryption, so that bad actors or unauthorized parties may gain access to the attachment. IDDs may occur when the wrong recipients are listed on emails. Thus, the outbound emails may be sent to the wrong parties and may even go to the wrong organization and information in the emails may become accessible to those parties. IDDs also may occur when sensitive or confidential information is included in the body of emails.

Such IDDs may cause reputational damage to an organization. For instance, a customer may be upset because the IDD disclosed sensitive information about their organization. IDDs may result in the loss of business because customers no longer trust the organization from which the emails were sent to handle their confidential information properly. IDDs may affect contract negotiations with parties. For instance, an IDD may reveal a party's strategy during a negotiation and give the counter-party an unfair insight that can be leveraged.

SUMMARY

In accordance with an inventive facet, a method is performed by a processor of a computing device. The method includes processing an outbound email message from a sender in an organization with the processor to determine if the outbound email message is likely to result in an IDD if sent. The processing entails applying a set of rules to the outbound email message to see if the outbound email message breaks or follows rules in the set of rules and also entails comparing the outbound email with historical patterns of components of previously sent outbound emails from the organization to determine how well the outbound email message conforms with the historical patterns. The processing further entails performing behavioral checks on the outbound email message with an artificial intelligence model to see if the outbound email message is likely to result in an IDD if sent and determining if the outbound email message is likely to result in an inadvertent data disclosure if sent based on the applying, the comparing, and the performing. Where it is determined that the outbound email message is likely to result in an IDD if sent, at least one remediating action may be triggered.

The remediating action may include at least one of blocking the outbound email message from being sent, making the outbound email message accessible by a reviewer, generating a notification or alert, informing the sender that the outbound email message likely will result in an IDD if sent, or modifying the outbound email message to eliminate or reduce the IDD. Where it is determined that the outbound email message is not likely to result in an IDD if sent, the outbound email message may be allowed to be sent.

The determining if the outbound email message is likely to result in an IDD if sent may comprise determining a score indicative of whether the outbound email message is likely to result in an IDD if sent from results of the applying, the comparing, and the performing and based on a comparison of the score with a threshold, determining if the outbound email message is likely to result in an IDD if sent. The comparing of the outbound email with historical patterns of components of previously sent outbound emails from the organization may entail using a multi-hierarchical clustering model in the comparing. The multi-hierarchical clustering model may be trained on historical outbound emails sent from the organization that did not result in an IDD when sent. The set of rules may include at least one of a rule requiring that any attachment for the outbound email message be encrypted, a rule prohibiting certain types of attachments for the outbound email message, a rule requiring that recipients identified in the outbound email message appear on a whitelist of approved recipients, a rule requiring that the outbound email message not include any sensitive terms, or a rule requiring that the recipients are not from multiple organizations. The performing of behavioral checks on the outbound email message with the artificial intelligence model may identify characteristics of the outbound email message that are anomalies relative to normal characteristics of historical outbound messages. An email program may include a plugin, and wherein the processing of the outbound message may be initiated via the plugin.

A non-transitory computer-readable storage medium may store computer programming instruction that when executed by a processor cause the processor to perform the method. The non-transitory computer-readable storage medium may be part of a computing device that includes a processor.

BRIEF DESCRIPTION OF THE DRAWINGS

FIG. 6C depicts a table of alerts that may be generated by the rules engine in exemplary embodiments.

DETAILED DESCRIPTION

Figure 1:
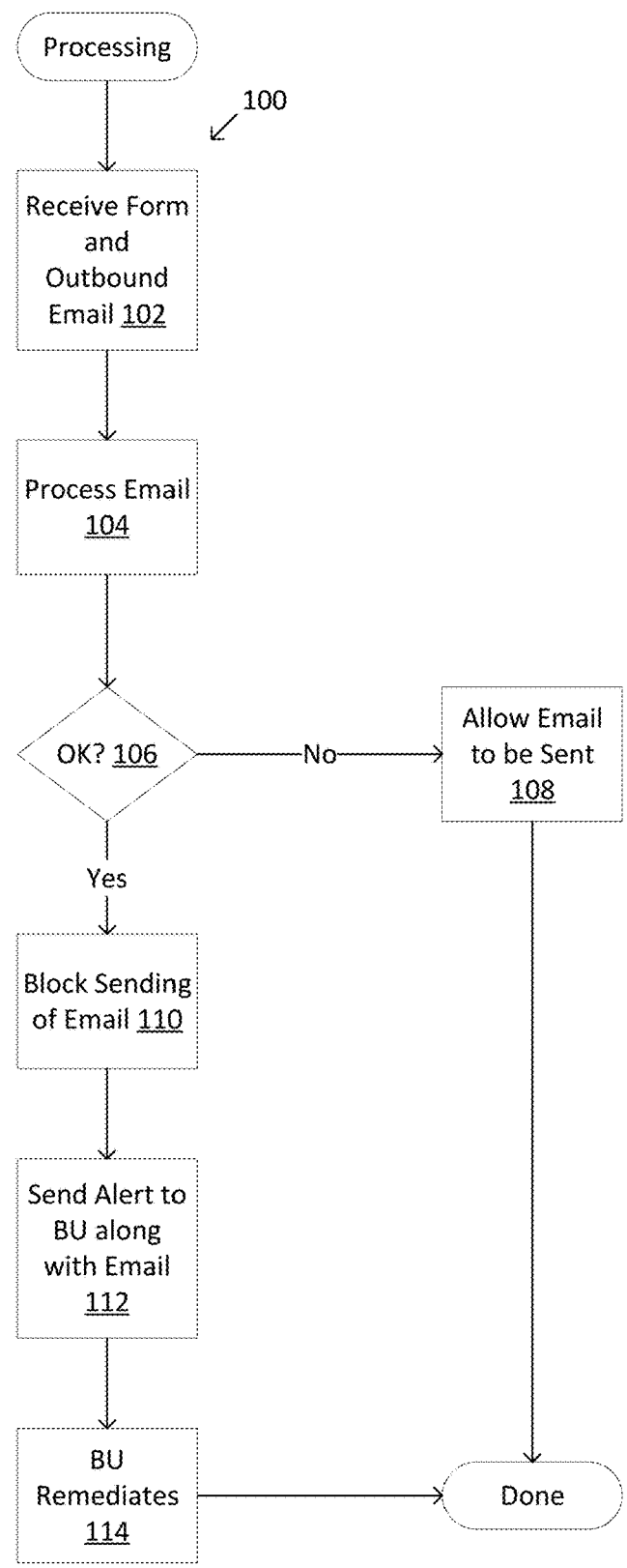
FIG. 1 depicts a flowchart of illustrative steps that may be performed in exemplary embodiments to process an outbound email.

One conventional approach to preventing IDDs is to send outbound emails from a business unit, an organization or another logical division of the organization to a human review team. An "outbound email" as used herein refers to an email originating within an organization, business unit, or other logical division of the organization to recipients that are not part of the organization, business unit or other logical division of the organization. The human review team reviews these outbound emails and identifies ones with IDD risks.

One of the problems with this approach is that the reviewers may miss IDDs. Another problem is the scale of the effort required for handling the review of all outbound email messages from a large organization or business unit. The review requires a large team at a substantial cost.

The exemplary embodiments may help reduce the burden on the reviewers or in some instances, may replace or reduce the number of the human reviewers needed for review by using artificial intelligence techniques to identify IDD risks in outbound emails. The exemplary embodiments may provide a broader and more robust review of the outbound emails for IDD risks. Further, the exemplary embodiments may improve the accuracy of the review of outbound emails relative to purely manual approaches.

Exemplary embodiments may employ artificial intelligence models to identify outbound emails that are at risk of containing IDDs. The identified emails may be automatically blocked and/or may be forwarded to a reviewer for further scrutiny and/or remediation. The reviewer may review the emails and determine whether the emails should be blocked from being sent and/or whether the emails should be remediated. The reviewer may be a human reviewer or may be an automated agent for reviewing the identified issues with the emails. The identified emails may be returned to their senders or associated business unit or organization, and the senders or remediating parties may modify the emails and attempt to send out the modified emails. The exemplary embodiments may send notifications and/or alerts to help in the remediation of the IDD risks. In some instances, the exemplary embodiments may automatically remediate at least some of the IDD risks.

The artificial intelligence models may perform certain pre-checks on the outbound emails. These pre-checks may identify certain known issues that may be lead to IDDs. A rules based engine may apply rules to the outbound emails. The rules may determine whether alerts should be generated and/or whether they emails should be permitted to be sent to the recipients. A multi-hierarchy clustering model may be applied to the emails to determine similarity scores for the emails that reflect their similarities to prior emails, and based on the similarity scores, alerts for some of the emails may be triggered to alert that those emails are likely at risk of containing an inadvertent data disclosures. A behavioral model may be applied to the emails. The behavioral model checks for any anomalies as to the behavior associated with the email. For instance, normally only two emails per day are sent from the sender, so when the sender attempts to send a third email that day, the behavioral model may flag this anomaly. Other items such as what recipients are typically listed in the emails and when emails are typically sent may be known by the behavioral model and checked by the behavioral model.

In some exemplary embodiments all of these artificial intelligence models may be used. In other exemplary embodiments, only a subset of the artificial models are used. Different combinations of the artificial intelligence models described herein may be used in various exemplary embodiments. Moreover, each artificial intelligence model may work independently or instead may work cooperatively in some exemplary embodiments. For example, in some exemplary embodiments, all of the artificial intelligence models may generate outputs and these outputs may be combined to determine if an outbound email has an IDD risk and should be blocked and an alert triggered. In other exemplary embodiments, each model may independently identify IDD risks for an outbound email and respond with an alert and/or blocking the outbound email. The outbound email may be processed by the respective artificial intelligence models in a sequence.

FIG. 1 depicts a flowchart 100 of illustrative steps that may be performed in exemplary embodiments to process an outbound email. At 102, a sender of an outbound email may complete a form indicating that the sender wishes for the outbound email to be subject to IDD risk review before being sent out. The sender may forward the form and the email to a review group for review. At 104, the reviewer may process the email to identify an IDD risk by applying one or more artificial intelligence models as will be described in more detail below. At 106, as a result of the review, a conclusion is reached of whether the email poses an IDD risk or not. If there is no substantial IDD risk identified, at 108, the email may be sent out of the organization, business unit, or other logical division of the organization. If, however, an IDD risk is identified, at 110, the email may be blocked from being sent and at 112, an alert and possibly the email may be returned to the business unit or sender for remediation. At 114, the sender, a remediation program, or another party in the business unit may remediate so that the email may be sent to its destination. The remediated email may need to be subject to review again in some exemplary embodiments.

Figure 2A:
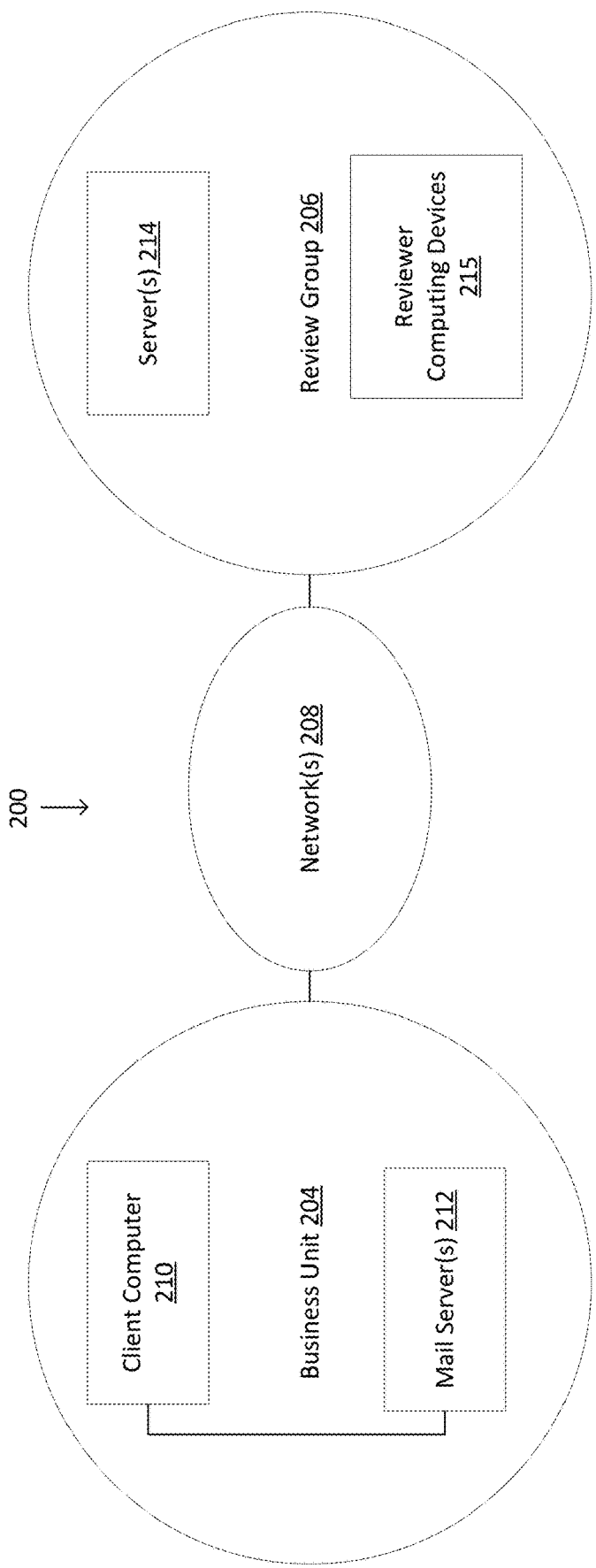
FIG. 2A depicts an illustrative configuration for facilitating the review of an outbound email for IDD risk in exemplary embodiments.

FIG. 2A depicts an illustrative configuration 200 for facilitating the review of an outbound email for IDD risk in exemplary embodiments. The sender may be using a client computer 210 to originate the outbound email. The client computer 210 may run an email program for creating, editing, sending, and receiving emails. The client computer 210 may interact with one or more email servers 212 associated with a business unit 204 for the sender. When the sender completes the request form and submits a request for review of the outbound email, an application program interface (API) call may be made to a web service running on server(s) for a review group 206. The API call may be transmitted over network(s) 208 to the review group server(s) 214. The networks(s) may include various local area networks and/or wider area networks, including wired and wireless networks and may include the Internet, intranets, etc. The server(s) 214 may be part of a public cloud, a private cloud or may simply be standalone server(s). The server(s) 214 may be accessible via a web interface in some exemplary embodiments. The server(s) 214 perform the processing mentioned above for identifying IDD risk. The reviewers may have reviewer computing devices 215 to facilitate review of the results of the processing of outbound emails and to take additional actions as described herein. The reviewers may gain access to the web services provided by the server(s) 214, by using a web browser or the like. The reviewers may access the IDD risk assessment results and take actions as will be described in more detail below. Any alerts and requests for remediation may be sent via an API call from the reviewers back over the network(s) 208 to the business unit 204 and possibly to the client computer 210. The computing resources of the client computer 210 and the server(s) 214 are detailed below.

Figure 2B:
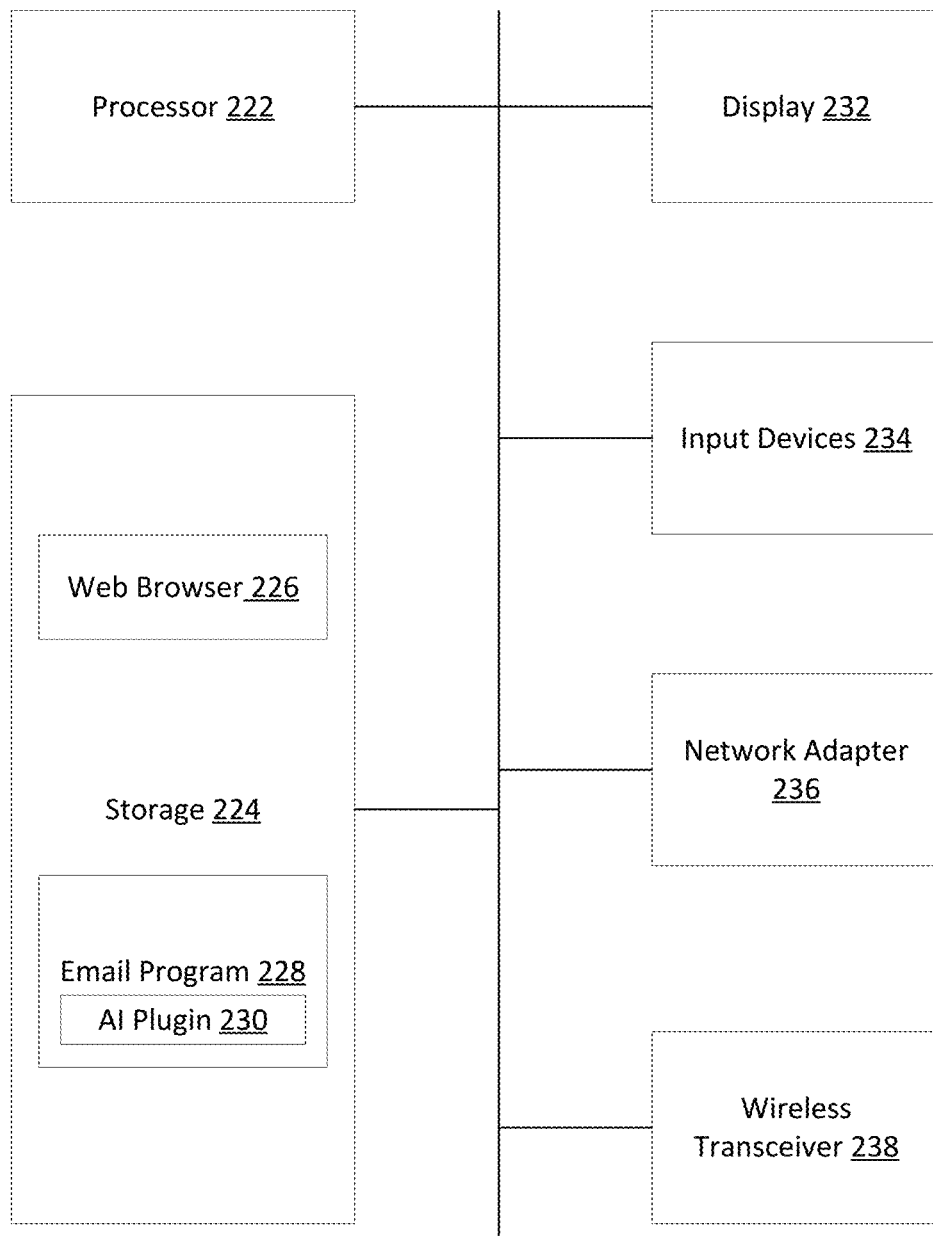
FIG. 2B depicts a block diagram of an illustrative client computing device that may be used in exemplary embodiments.

FIG. 2B depicts a block diagram of an illustrative client computing device 220 that may be used in exemplary embodiments. The client computing device 220 may include a processor 222 for executing computer programming instructions and controlling operation of the client computing device 220. The processor 222 may be or may include, for example, a central processing unit (CPU), a graphics processing unit (GPU), a field gate programmable gate array (FPGA), an application specific integrated circuit (ASIC) or other type of processing logic. The client computing device 220 may further include a storage 224 for storing data, documents, file and computer programming instructions. The storage 224 may include varieties of read only memory (ROM), random access memory (RAM), solid state memory, magnetic disk storage, optical disk storage and other non-transitory processor-readable storage media. The storage 224 may store a web browser 226 that may be run by the processor 222. The storage 224 may also store an email program 228. The email program 228 may allow the generation, editing, transmission and receipt of email messages. The email program 228 may also facilitate storage of email messages. The email program 228 may include an artificial intelligence plugin 230 for performing the functionality described herein for the client computing device 220 relating to processing outbound emails to identify risks of IDDs.

The client computing device 220 may include a display, such as an LCD display, an LED display, a retinal display, or a CRT device. The client computing device 220 may include input devices 234, like a keyboard, a thumbpad, a mouse, a pointing device, a microphone, or the like for receiving input. The client computing device 220 may include a network adapter 236 for enabling the client computing device to a connect to networks, and a wireless transceiver 238 for enabling the client computing device to communicate over a wireless network, including a WiFi network, a cellular network, or via a wireless connection, such as with NFT connections.

Figure 2C:
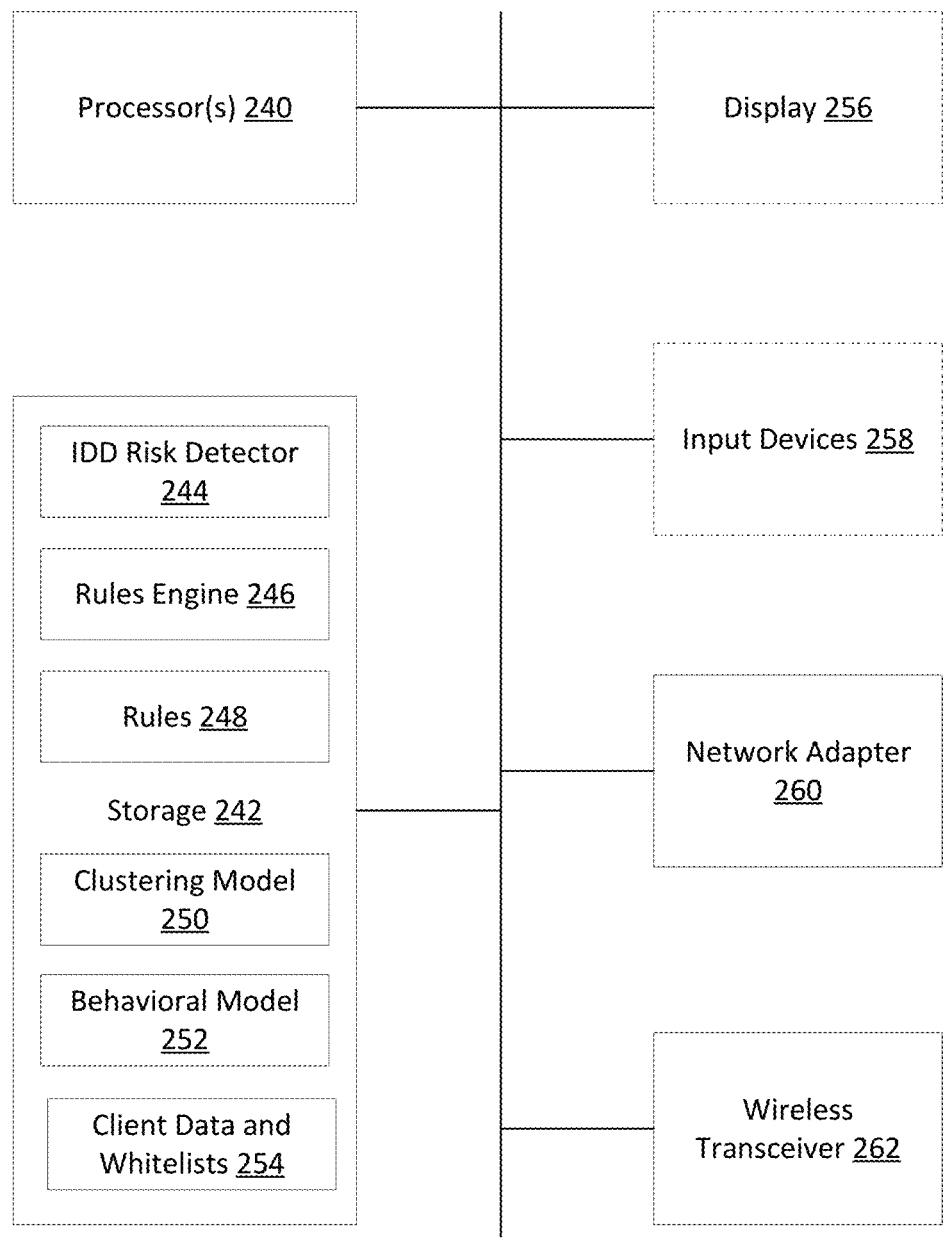
FIG. 2C depicts an example of a server that may be used in the exemplary embodiments.

FIG. 2C depicts an example of a server 214 that may be used in the exemplary embodiments. The server 214 may be a computing device that includes a processor, such as the processor types described above relative to the client computing device 220. The server 214 may include a storage 242 for storing computer programming instructions, data, documents, files and the like. The storage 242 may include any of the various forms of storage described above relative to storage 224. The server 214 may store computer programming instructions for the IDD risk detector 244 described herein. The IDD risk detector 244 may be a web service that may be accessed by parties that wish to have their outbound emails processed to identify IDD risks and by reviewers that review the result of processing of outbound emails by the IDD risk detector. The IDD risk detector 244 may be realized as a web portal in some embodiments. The web portal may be accessible, for instance, over the internet or over an intranet in some exemplary embodiments. The storage 242 may also store a rules engine 246 and rules 248, which may be used in processing outbound emails by the IDD risk detector in exemplary embodiments. A clustering model 250, such as multi-hierarchy clustering model, may be stored in the storage 242. The clustering model 250 may determine the similarities of the outbound emails to historic outbound emails as part of the processing performed by the IDD risk detector 244. A behavioral model 252 may be stored in the storage 242. The behavioral model 252 may be used by the IDD risk detector to identify anomalies in the behavior as reflected in an outbound email relative to historical patterns. Client data and whitelists 254 may be stored in the storage. It should be appreciated that in some exemplary embodiments the rules engine 246, rules 248, clustering model 250, behavioral model 252, and client data and whitelists 254 may be store external to the server 214 but are accessible to the server 214.

It should be appreciated that the server 214 may be part of a cluster, such as found in a public or private cloud. Moreover, multiple instances of the components stored in the storage may run on separate servers.

Figure 2D:
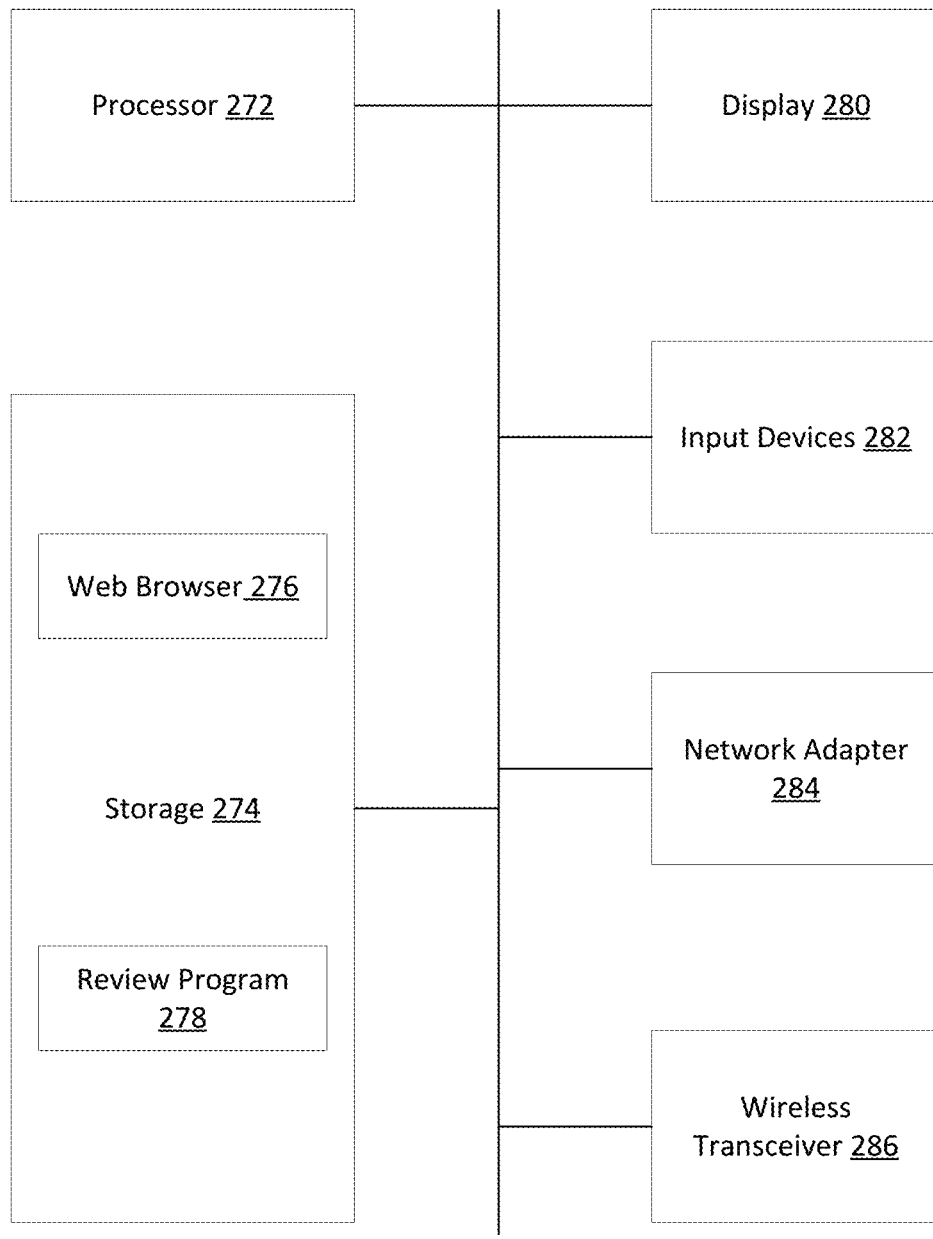
FIG. 2D depicts an example of reviewer computing device that may be used in exemplary embodiments.

FIG. 2D depicts an example of reviewer computing device 270. The configuration of the reviewer computing device 270 may be like that of the client computing device 220 but with different software. The reviewer computing device 270 may include a processor 272, a storage 274, a display 280, input devices 282, a network adapter 284, and a wireless transceiver 286. The storage 274 may store a web browser 276 and a review program 278. The web browser 276 may be used to access web services, like IDD risk detector 244, on a web platform like the Internet or an intranet. In some embodiments, the review program 278 provides access to functionality used to review the results of the processing of outbound emails, to forward outbound emails for remediation, and to permit outbound emails to be sent out. In some instances, the review program 278 may be separate from the IDD risk detector 244. In other instance, the functionality of the review program 278 is provided by the IDD risk detector 244.

Figure 3:
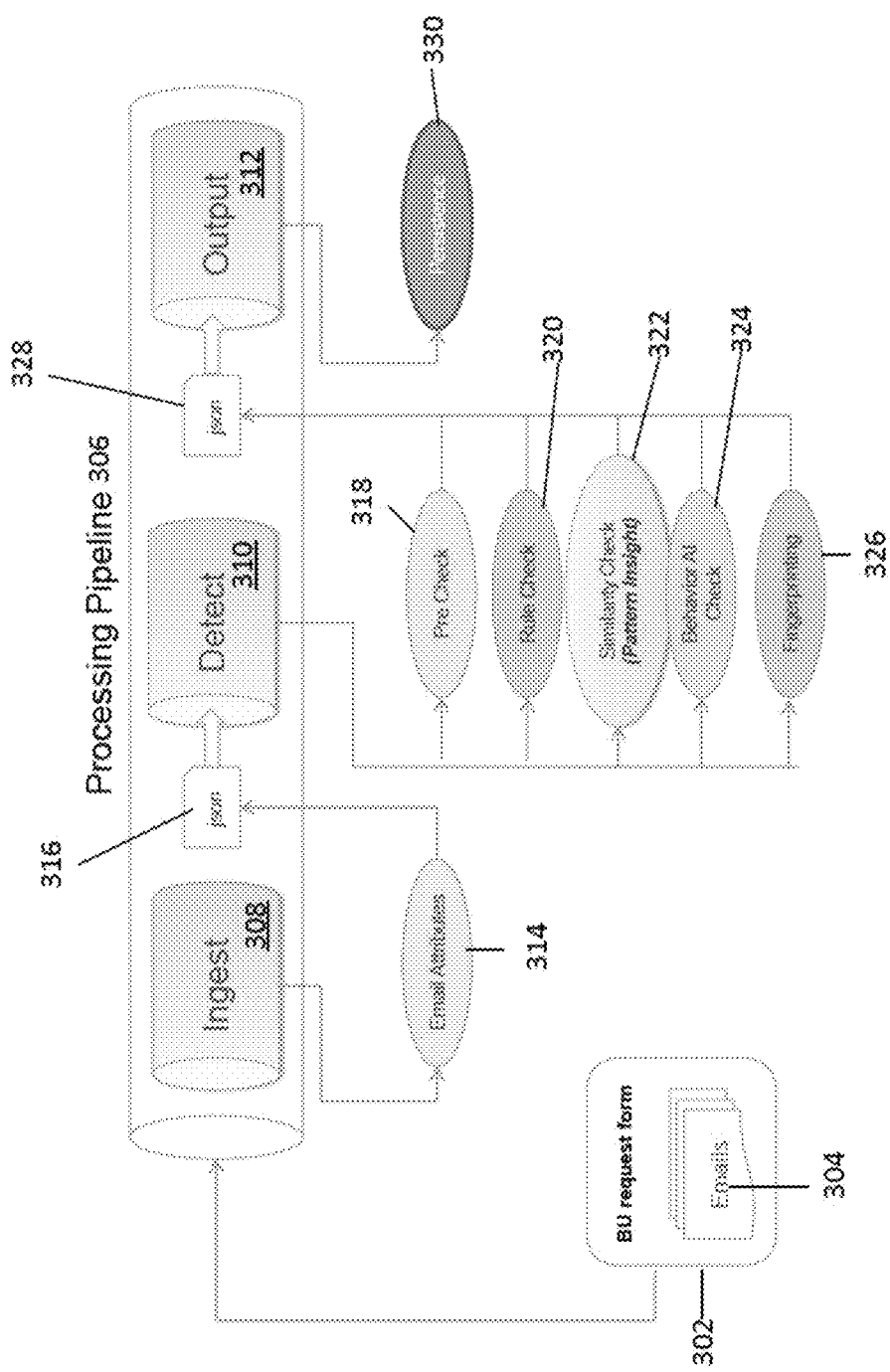
FIG. 3 depicts a processing pipeline that may be performed in exemplary embodiments by computer programming instructions in processing an outbound email to identify possible IDD risks.

FIG. 3 depicts a processing pipeline 306 that may be performed in exemplary embodiments by computer programming instructions in processing an outbound email to identify possible IDD risks (see 104 of FIG. 1). The processing pipeline 306 may be part of the IDD risk detector 244. The processing pipeline 306 may receive the request form 302 and the associated outbound email 304 that has been sent by the sender for review. An ingest stage 308 may parse the request form 302 and the email 304 to extract attributes 314. These email attributes 314 may be, for example, put into a file 316, such as a JavaScript Object Notation (JSON) file where the extracted attributes are specified in the file 316 as attribute values pairs or arrays. The file 316 is then processed by a detect stage 310. The detect stage 310 is responsible for processing the email attributes with the artificial intelligence models. As shown in FIG. 3, the detect stage 310 may apply a pre-check 318 to the outbound email. The pre-check 318 may perform certain checks that are performed initially to identify IDD risk. A rule check 320 may be performed. The rule check 320 may be performed by a rules engine that applies a set of rules to the outbound email to identify IDD risk. In some embodiments, the pre-check 318 and the rule check 320 may both be applied by the rules engine. In other embodiments, separate programmatic entities may perform the pre-check 318 and the rule check 320. A similarity check 322 may be performed on the outbound email. The similarity check 322 may apply a multi-hierarchy clustering model in some exemplary embodiments. The similarity check 332 may compare the outbound email to known email patterns and identify how similar the outbound email is to the known patterns. A behavior artificial intelligence check 324 may be performed to see if the behavior represented by the outbound email is an anomaly. A digital fingerprinting 326 of the outbound message may be performed to capture the fingerprint of the outbound email message to enable the behavioral model to continue to learn email behavior, such as attachment count for outbound emails, normal frequency of outbound emails, size of outbound emails and/or attachments, recipient count for the outbound emails, etc.

The outputs from the models 318, 320, 322, and 324 may be put in a file 328, such as a JSON file, and passed to the output stage 312. The output stage 312 may indicate that the outbound email poses an IDD risk and may indicate why. Alternately, the output stage 312 may indicate that the outbound email does not pose an IDD risk. The output from the output stage 312 may be stored in a persistent storage like a database or other repository. The output from the processing pipeline 306 may be reviewed by a reviewer who may decide what action should be taken with respect to the outbound email.

Figure 4:
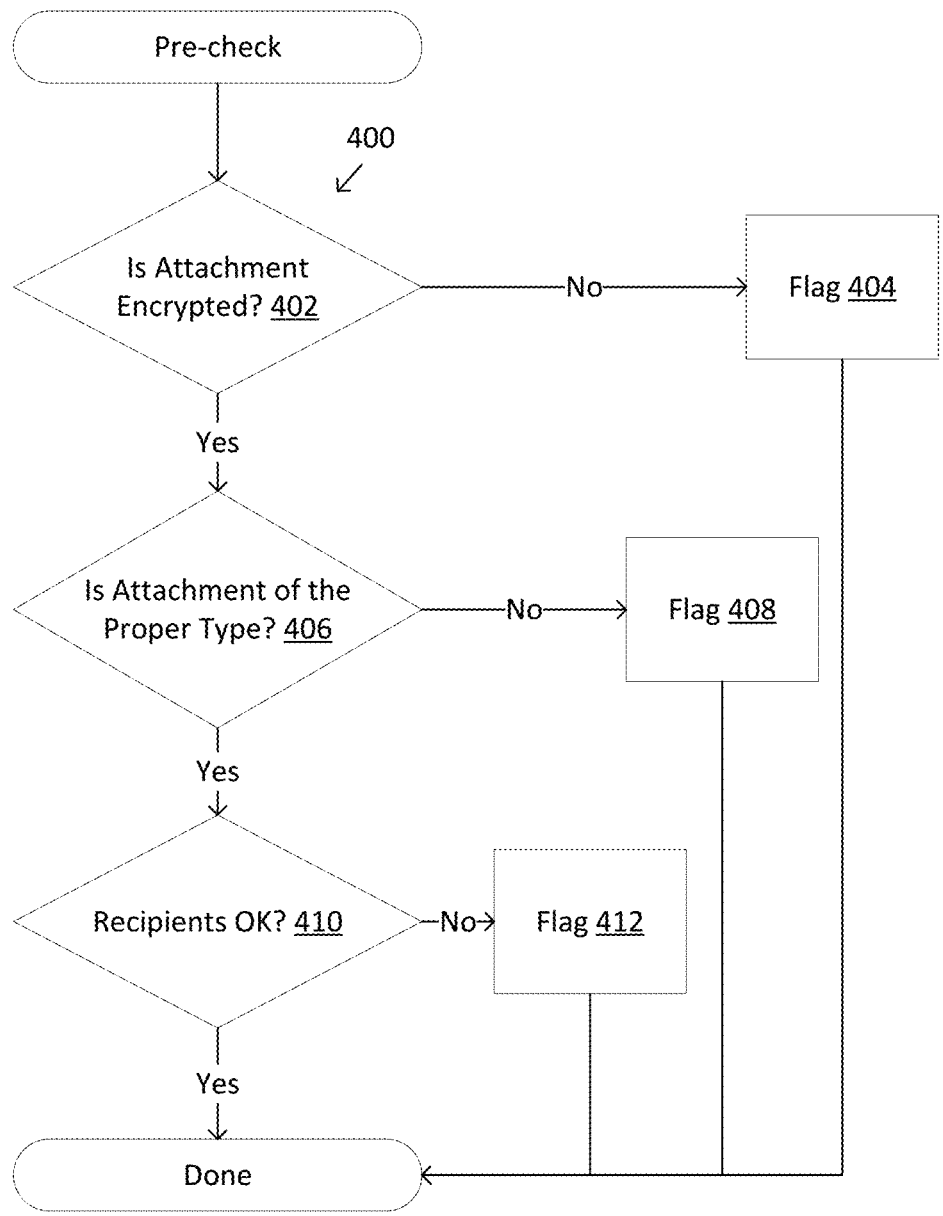
FIG. 4 depicts a flowchart of illustrative steps that may be performed in exemplary embodiments as part of the pre-check.

FIG. 4 depicts a flowchart 400 of illustrative steps that may be performed in exemplary embodiments as part of the pre-check 318. These steps are shown purely as being illustrative and not intended to be limiting. Moreover, the depiction of the checks in FIG. 4 is not meant be an exhaustive depiction. In some exemplary embodiments, the precheck checks whether the outbound email conforms with standard practices for a client, customer or other variety of recipient. At 402, a check is made if an attachment is encrypted. This check may be performed for each attachment of the outbound email. If the attachment is encrypted, there is less likelihood of an IDD because an unintended recipient or a bad actor likely cannot access the contents of an encrypted attachment. Thus, an unencrypted attachment is flagged at 404 as an IDD risk. At 406, a check is made whether the attachment is of the proper type. For instance, if a spreadsheet is supposed to be attached, a check can be made is the file is of a spreadsheet file format. If not, at 408, the attachment type mismatch is flagged. At 410, a check is made of the recipients based on their email addresses. As will be discussed below, a whitelist may be maintained for clients and other email addresses. The whitelist contains approved email addresses for parties to which an outbound email may be sent.

Figure 5:
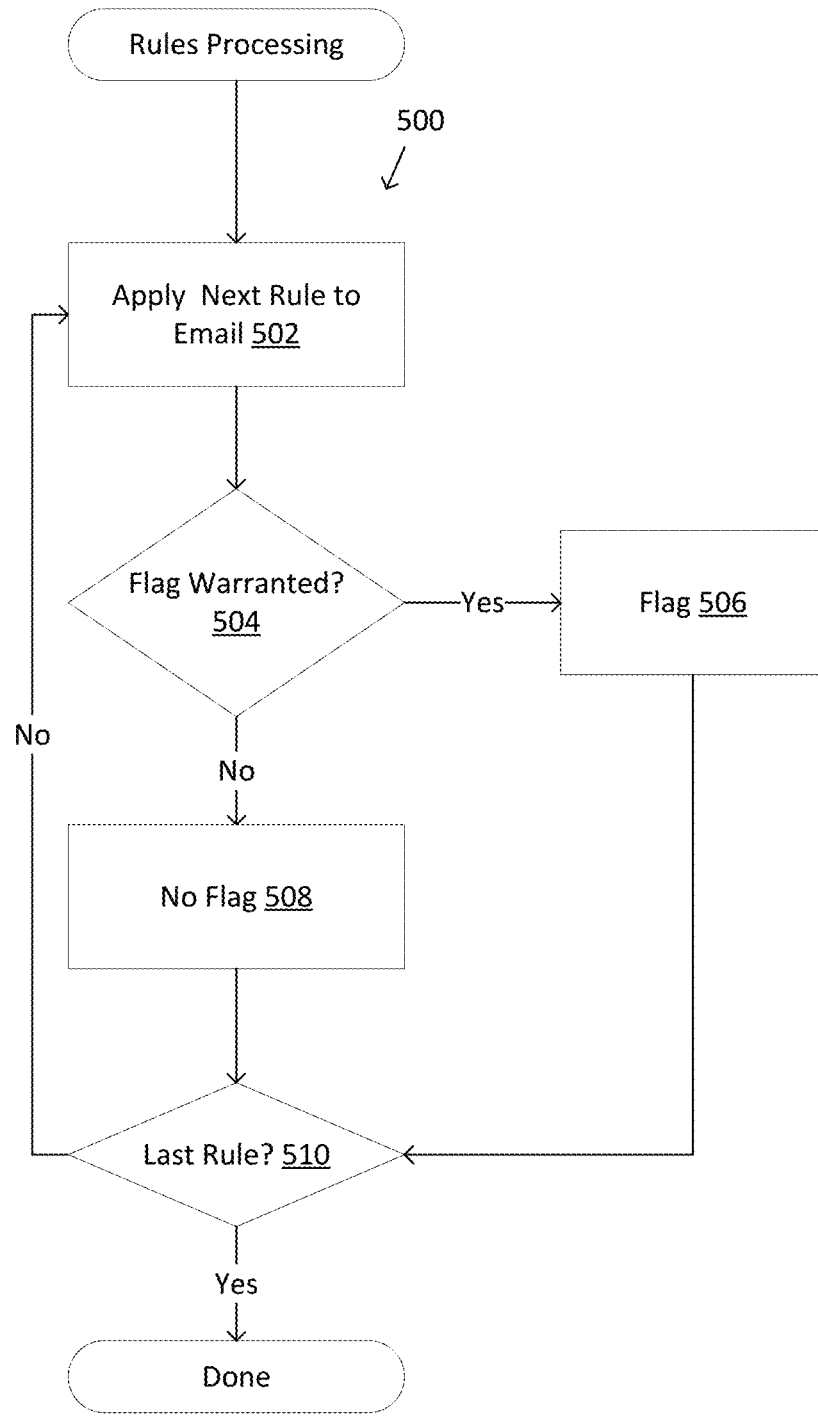
FIG. 5 depicts a flowchart of illustrative steps that may be performed in exemplary embodiments as part of the rule check.

FIG. 5 depicts a flowchart 500 of illustrative steps that may be performed in exemplary embodiments as part of the rule check 320. A set of rules may be established and applied to the outbound email identifying the IDD of the outbound email. These rules may be applied one at a time to the outbound email. At 502, a next rule may be applied to the email. The rule, for example, may indicate that if certain attributes are present in the outbound email, the email should be flagged as an IDD risk. After applying the rule, at 504 a check is made of whether the outbound email should be flagged based on the rule. If so, at 506, the outbound email is flagged. If not, the outbound email is not flagged at 508. At 510, a check is made whether the applied rule is the last rule to be applied. If not, the processing continues at 502 with the application of a next rule to the outbound email. This process continues until the rules in the rules set have all been applied.

Figure 6A:
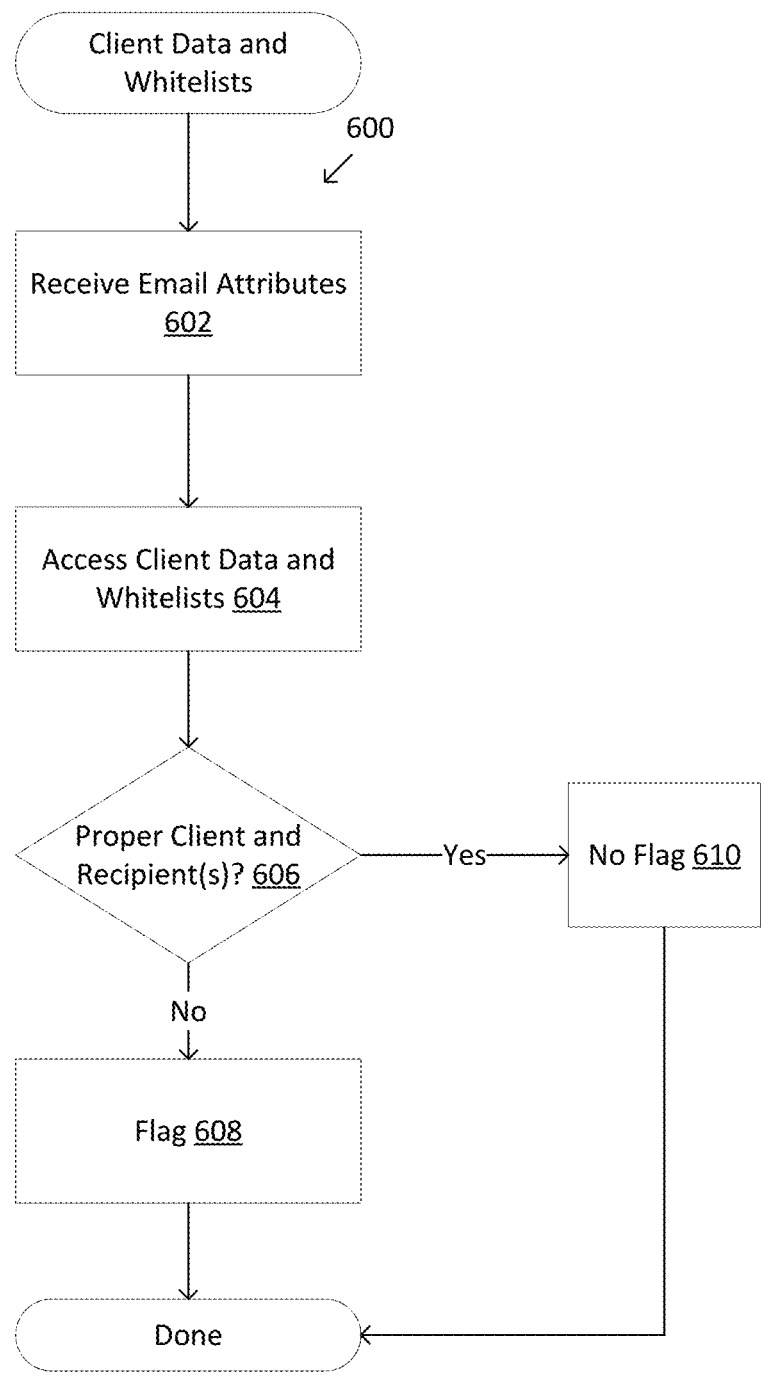
FIG. 6A depicts a flowchart of illustrative steps that may performed in exemplary embodiments where client data and whitelists may be used by the rules for an organization that is a business that serves clients.

FIG. 6A depicts a flowchart 600 of illustrative steps that may performed in exemplary embodiments where client data and whitelists may be used by the rules for an organization that is a business that serves clients. At 602, the email attributes of the outbound email are received by the rules engine. At 604, the client data and/or whitelists may be accessed in applying the rules. At 606, the rules may check whether the proper client information, like recipient email addresses and reference information, is used. If so, the rules dictate that the outbound email not be flagged at 610. If not, at 608, the issues are flagged.

Figure 6B:
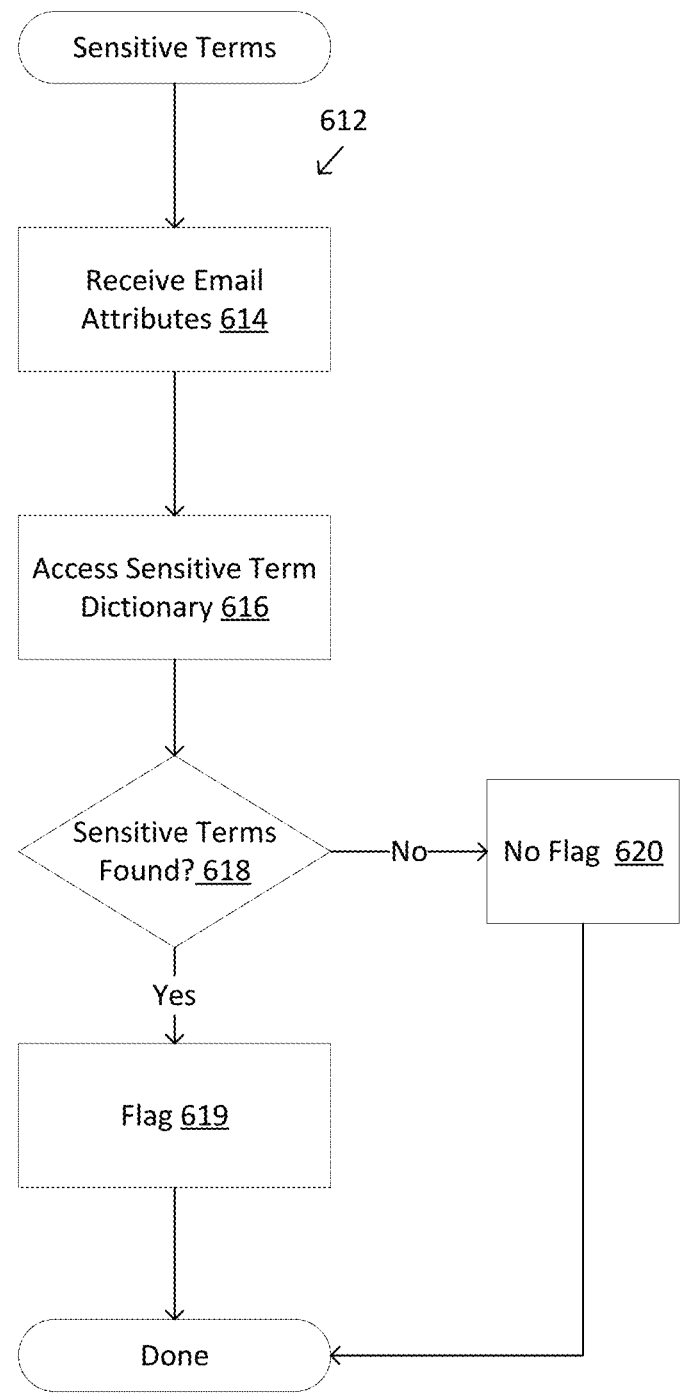
FIG. 6B depicts a flowchart of illustrative steps that may be performed in exemplary embodiments to identify sensitive terms.

As part of applying rules, the exemplary embodiments may identify sensitive terms in outbound emails. Sensitive terms may be defined specifically for each client or recipient organization, business unit or logical division of an organization. FIG. 6B depicts a flowchart 612 of illustrative steps that may be performed in exemplary embodiments to identify the sensitive terms. At 614, the attributes for the outbound email being processed are received. At 616, a sensitive term dictionary is then accessed, and at 618 a check is made whether any of the sensitive terms in the dictionary appear in the outbound email. In some embodiments, the sensitive terms may be organized on a per client basis, such that only sensitive terms for that client are checked. If so, at 619, the sensitive term is flagged. If not, at 620, no sensitive terms are flagged.

FIG. 6C depicts a table 621 of alerts that may be generated by the rules engine in exemplary embodiments. This table 621 is intended to be illustrative and not limiting. In other embodiments, different alerts may be generated. The table 621 lists an alert in each row. Each row contains an alert category 622 and a description 624. Row 626 is for an alert indicating that the email recipient client is not listed in the client database. Row 628 is for an alert indicating that the recipient is not on the whitelist for the client. Row 630 is for an alert indicating that the email recipient is not on the whitelist for the client to which the outbound email is being sent but that involves low risk terms. Row 632 is for an alert indicating that the outbound email includes sensitive information for multiple clients. Row 634 is for an alert indicating that the outbound email includes sensitive information for multiple clients but involves low risk terms. Row 636 is for an alert indicating that the outbound email contains a sensitive term but that the there is no whitelist entry for the sensitive term. Row 638 is for an alert indicating that there are no sensitive terms in the outbound email. Row 640 is for an alert indicating that a fund name is detected in email but the fund is not found in the client data fund list. This alert is particular to a financial services application. Lastly, row 642 is for an alert indicating that that recipient name, report name, or attachment name do not match the corresponding information listed in the client data.

Figure 7A:
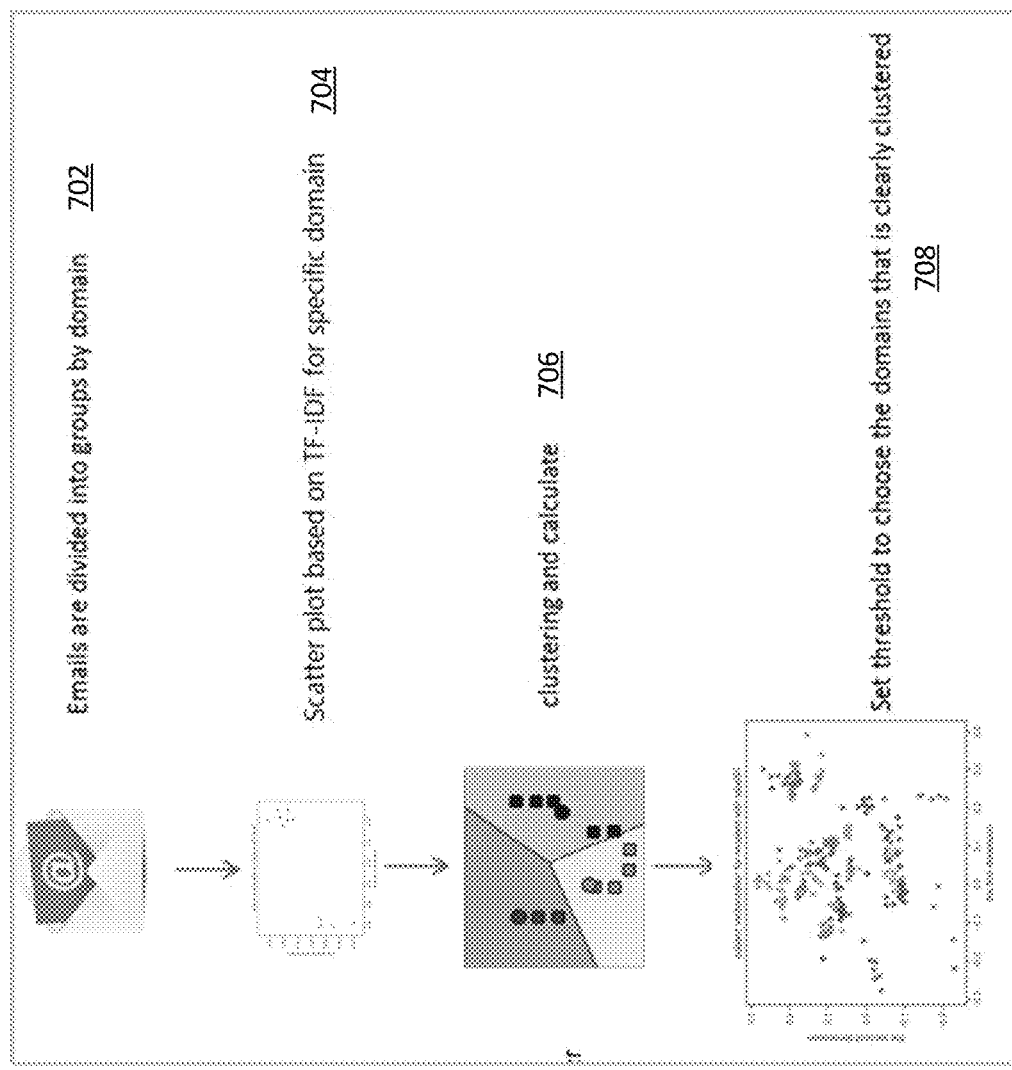
FIG. 7A depicts the steps that may be performed in training a clustering model in exemplary embodiments.

As mentioned above, the outbound emails may be compared to a clustering model to identify their similarity to historic emails at several levels. Before the clustering model can be used, the clustering model must be trained. FIG. 7A depicts the steps performed in such training. Initially, at 702, the historic emails that do not contain IDDs may be divided into groups by domain. At 704, a scatter plot may be created for each domain. The scatter plot is based on term frequency-inverse document frequency (TF-IDF). At 706, clustering is performed. At 708, a threshold is chosen and domains that are clearly clustered may be chosen.

Figure 7B:
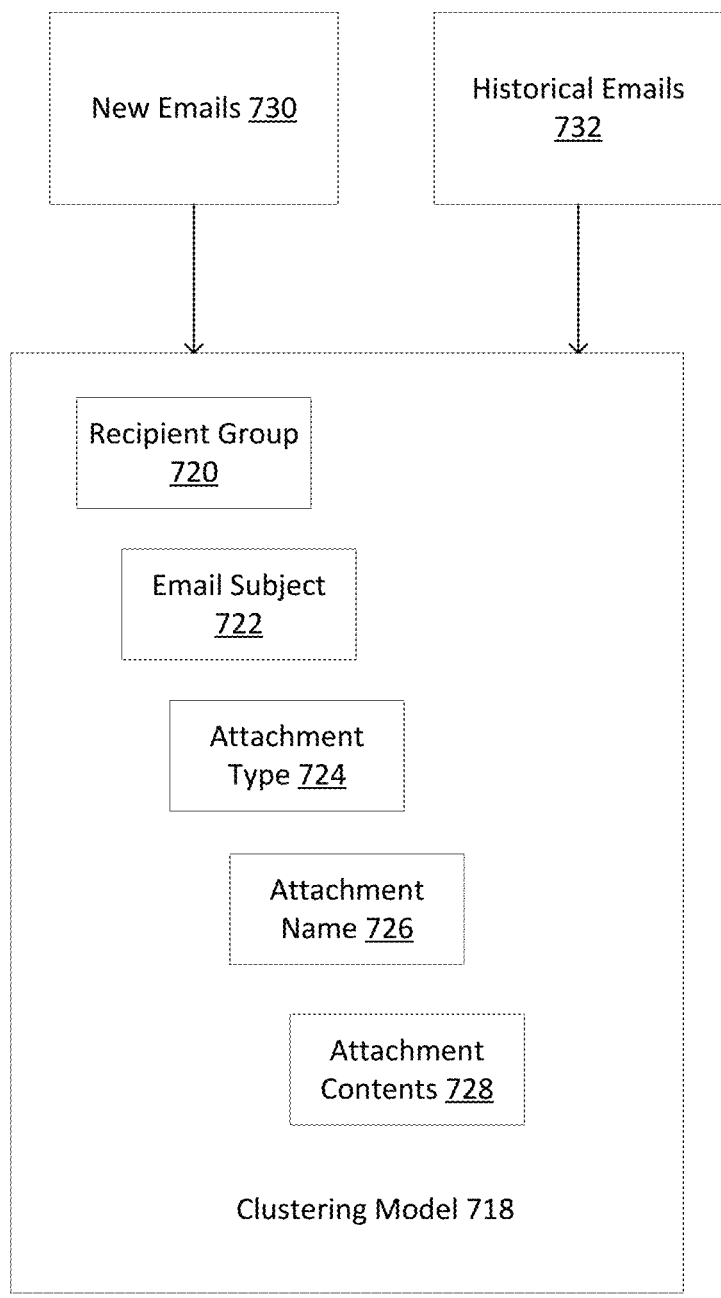
FIG. 7B depicts an example of a clustering model for exemplary embodiments.

FIG. 7B depicts an example of a clustering model 718 for exemplary embodiments. The model 718 is a multi-hierarchy clustering model having 5 layers 720, 722, 724, 726, and 728. Layer 1 720 concerns the recipient group. The clustering is a simple grouping based on recipient lists of the emails and requires no preprocessing. The comparison method is an exact match. Layer 2 722 concerns the email subject. The clustering is based on pair similarities of the email subjects. Preprocessing logic is applied to the emails. Layer 3 724 concerns attachment type. The clustering method is a simple grouping based on file type. No preprocessing is required. Layer 4 726 concerns attachment name. The clustering is based on pair similarity of file name. Preprocessing logic is applied to obtain the file names. Layer 5 728 concerns attachment content. The clustering method is based on pair similarity of file content. Content preprocessing logic is applied. The model is trained on historical emails 732 and may be applied to new emails 730 once the model is trained.

Figure 8A:
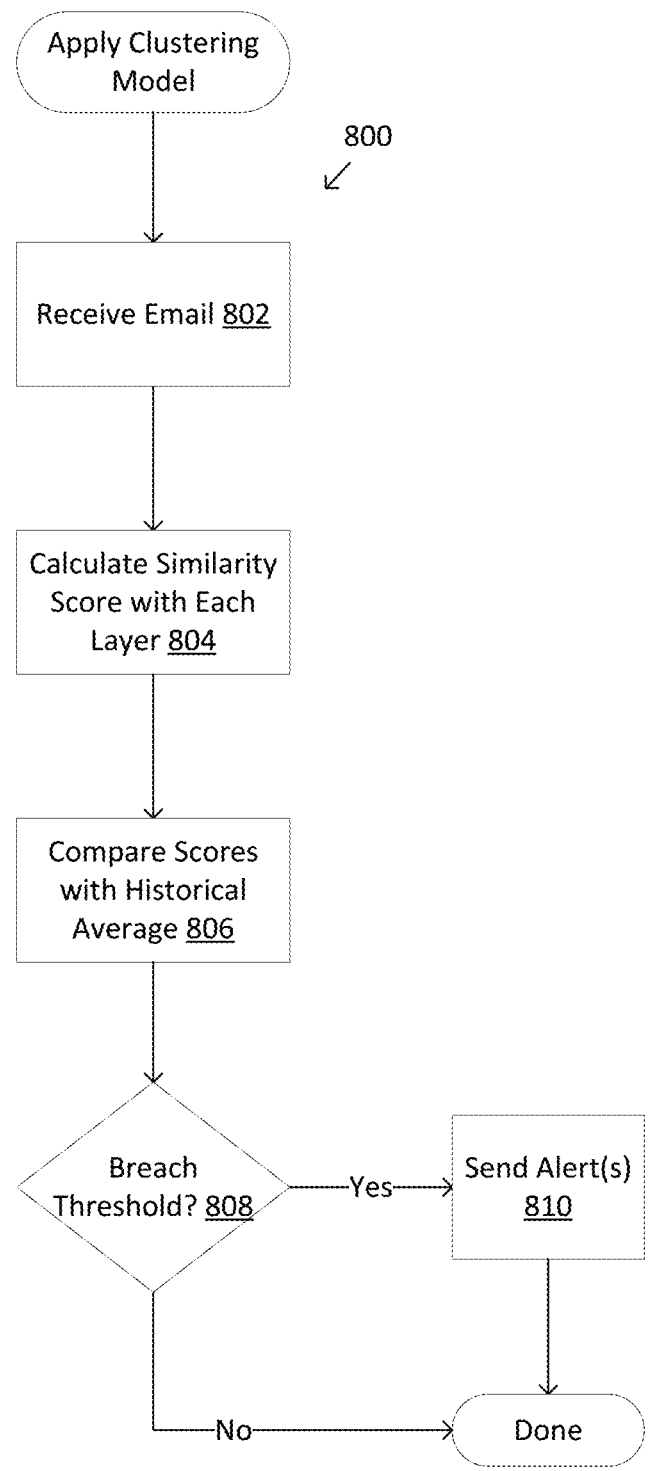
FIG. 8A depicts a flowchart of steps that may be performed in exemplary embodiments in applying the clustering model to an outbound email.

FIG. 8A depicts a flowchart 800 of steps that may be performed in exemplary embodiments in applying the clustering model to an outbound email. The application of the clustering model seeks to compare the outbound email being processed with historical emails to identify outbound emails that differ from those emails in the attributes of the layers enough to be of concern for posing an IDD risk. First, at 802 the outbound email or attributes of the outbound email are received for application to the clustering model. At 804, a similarity score is calculated for the outbound email for each layer of the model. At 806, the similarity scores are compared with historical averages. At 808, a check is made of whether the differences breach a threshold. If so, at 810, an alert may be generated.

Figure 8B:
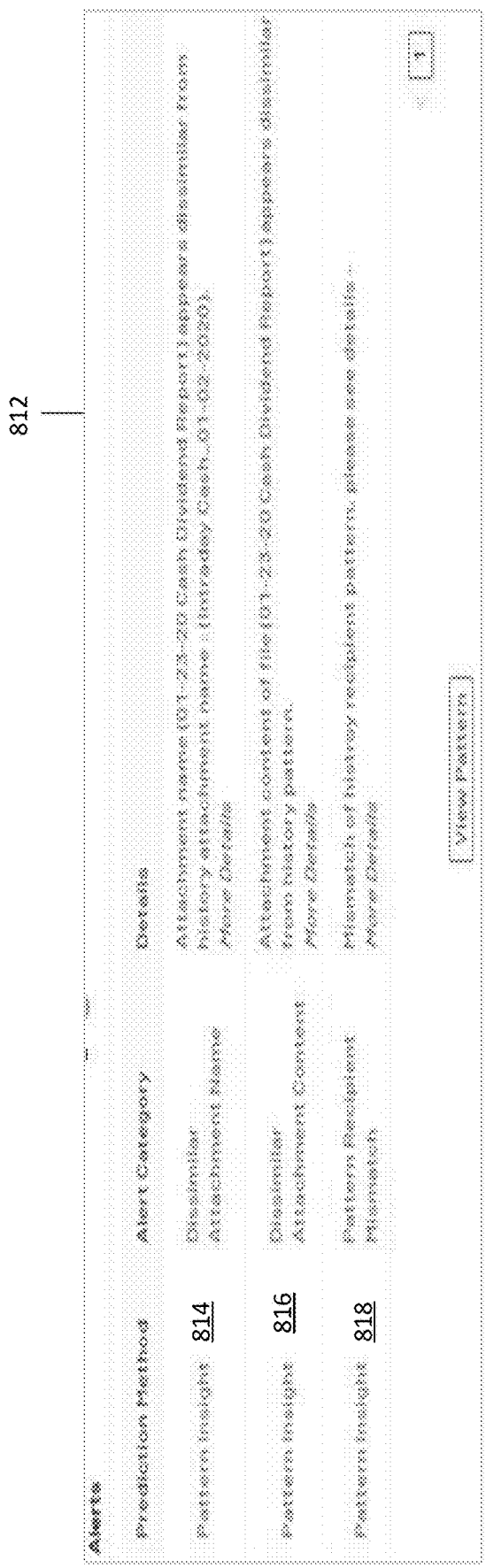
FIG. 8B depicts a chart of possible alerts that may be raised by the clustering model.

FIG. 8B depicts a chart 812 of possible alerts that may be raised by the clustering model. Alert 814 indicates that the attachment name differs from the historical norm. Alert 816 indicates the content of the attachment of an outbound email differs from the historical norm. Alert 818 indicates that there is a difference between the recipients of an outbound email and the historical norm.

Figure 8C:
FIG. 8C depicts an example of the pattern insight results that are produced from processing of an outbound email by the clustering model.

Pattern insight reports may be generated to provide insightful information resulting from the application of the clustering model. FIG. 8C depicts an example of the pattern insight results 820 that are produced from processing of an outbound email by the clustering model. The results 820 may identify the recipient group 822 for the outbound email. The subject 824 of the outbound email may be included. The history 826 that is used for comparison may also be included. The outbound email similarity score relative to the history 828 may be included as well as the history average similarity 830. Information 832 may also be included regarding the attachments. The information 832 for the attachments may include the file name 834 of the attachment in the outbound email and the historical attachment file name 836. The similarity score 838 for the outbound email attachment name and the historical attachment name may be included. The score 840 for the historical average similarity of names may be included. A similarity score 842 for the content of the attachment of the outbound email to the historical average may be included. The historical average similarity score 843 of emails on which the model was trained may be included. Although not shown in FIG. 8C, information regarding history pattern may also be displayed by selecting the History Patterns tab 844.

Figure 9A:
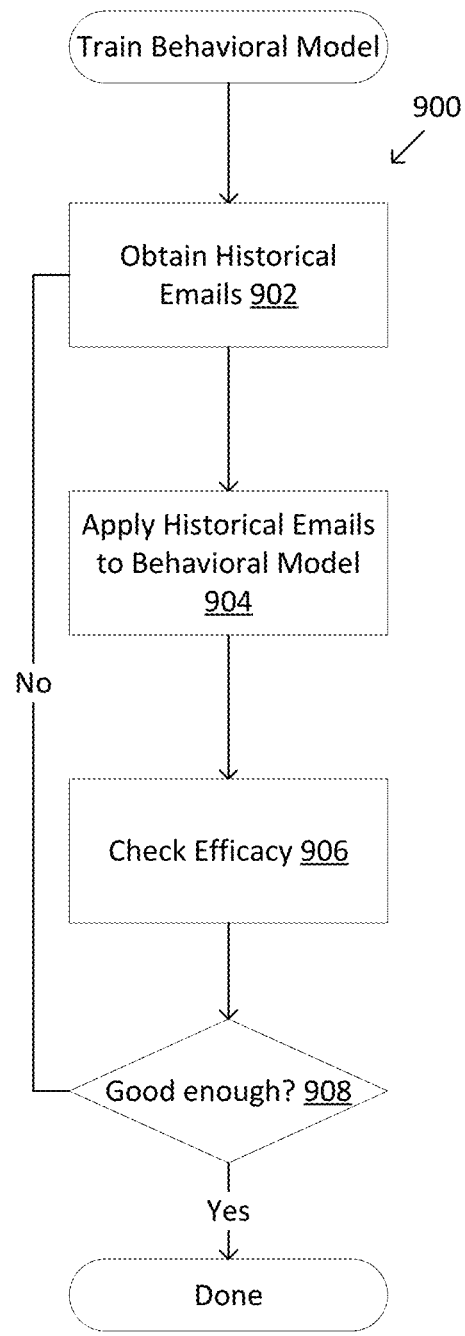
FIG. 9A depicts a flowchart of illustrative steps that may be performed in exemplary embodiments in training the behavioral model.

The behavioral model that is applied to outbound emails must also be trained. FIG. 9A depicts a flowchart 900 of illustrative steps that may be performed in exemplary embodiments in training the behavioral model. At 902, historical emails are obtained. These historical emails are those that do not include any IDDs. At 904, the historical emails are applied to the behavioral model. At 906, the efficacy of the behavioral model in identifying email behavior that differs from the historical norms is tested on a set of outbound emails. At 908, a check is made whether the efficacy is good enough such that no more training is needed. This may entail comparing results of a test run to a benchmark. If so, the training is halted. If not, the training continues at 902 with an additional set of historical emails.

Figure 9B:
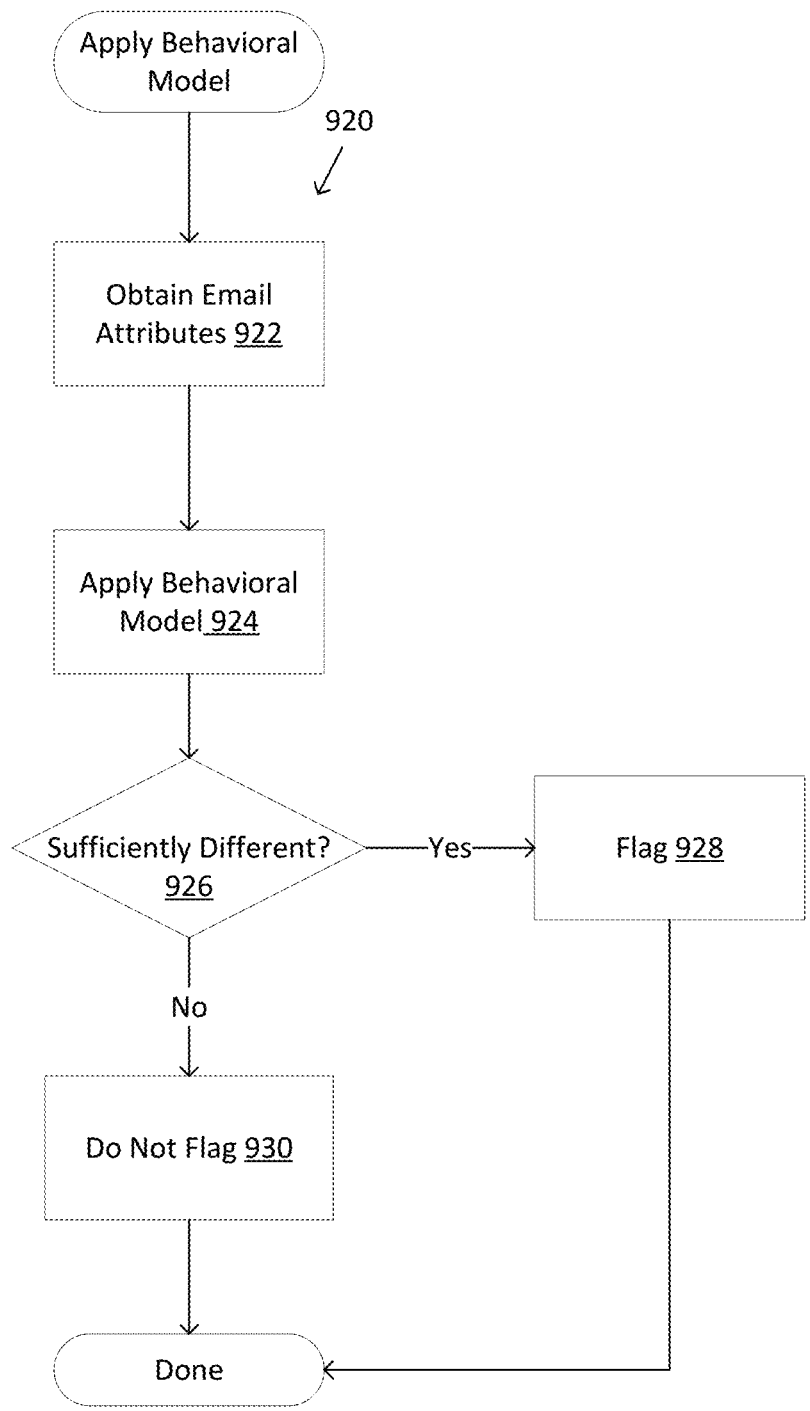
FIG. 9B depicts a flowchart of illustrative steps that may be performed in exemplary embodiments in applying the behavioral model to outbound emails.

Once the behavioral model is properly trained, the trained behavioral may be used. FIG. 9B depicts a flowchart 920 of illustrative steps that may be performed in exemplary embodiments in applying the behavioral model to outbound emails. At 922, the emails attributes of an outbound email may be obtained. At 924, the email attributes may be applied to the behavioral model. At 926, the behavioral model analyzes patterns of email behavior and identifies whether the outbound email has sufficiently different email behavior than historical email behavior. For instance, the behavioral model may identify things like the attachment type being different than normal, the attachment size being different than normal, the outbound email being sent at an unusual time or day, the recipient not being in previous email exchanges with the client, etc. If there are sufficient differences, at 928, the differences are flagged, such as by generating alerts that are visible to the reviewers. Otherwise, at 930, there are no flags (e.g., no alerts).

Figure 10:
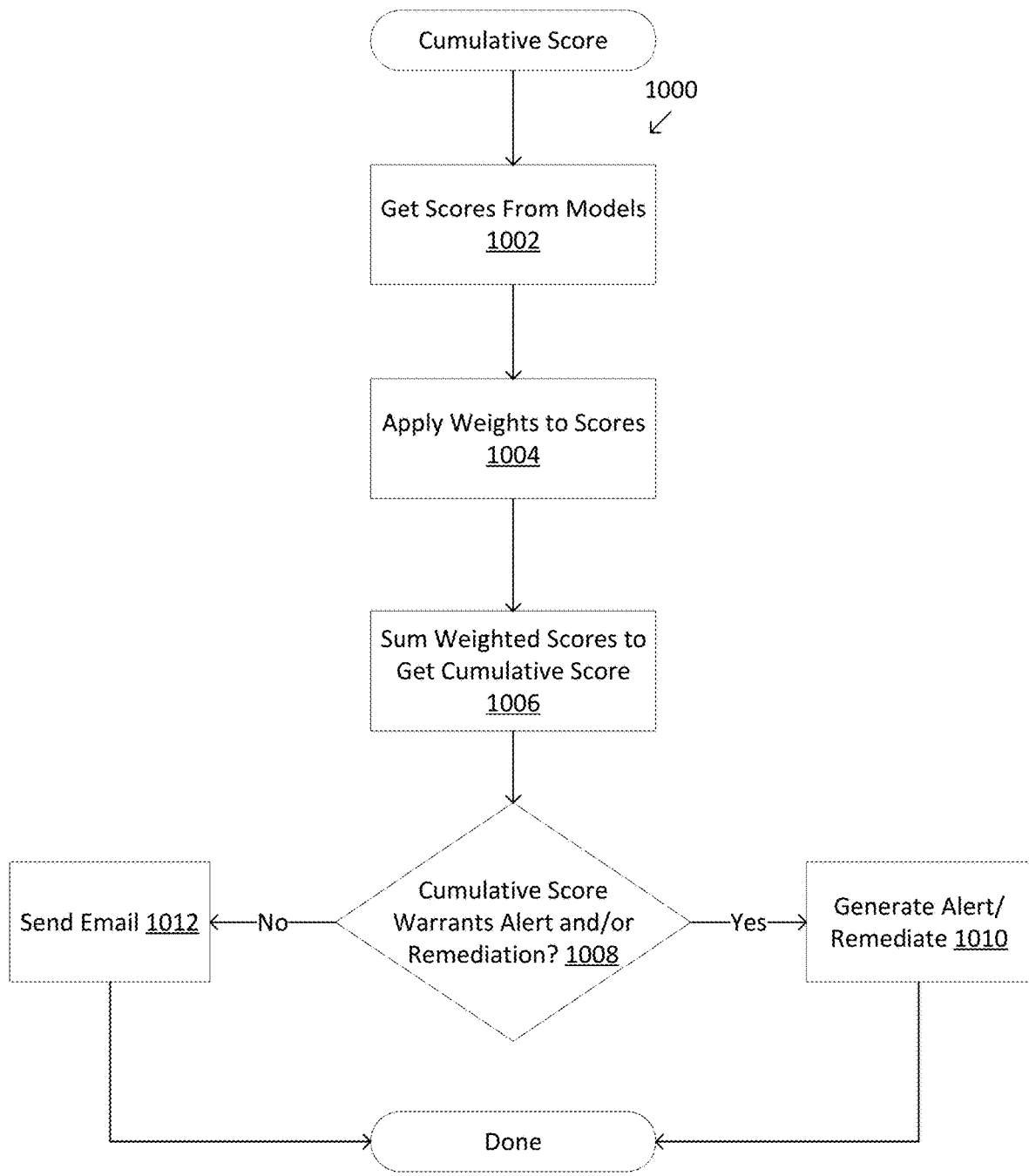
FIG. 10 depicts a flowchart of illustrative steps that may be performed in exemplary embodiments to generate a cumulative score for an outbound email that has been processed by the models.

As mentioned above, the models may take action independently or working together and act based on aggregate scores. FIG. 10 depicts a flowchart of illustrative steps that may be performed in exemplary embodiments to generate a cumulative score for an outbound email that has been processed by the models. At 1002, scores are generated by each model and those scores are obtained. The scores may be for instance probabilities that the outbound email is an IDD risk. At 1004, weights may be applied to the scores from the model. At 1006, the weighted scores may be summed to produce a cumulative score. At 1008, a check is made whether the cumulative score warrants alert(s) and/or remediation. If not, in some exemplary embodiments, at 1012, the outbound email may be released and sent to its intended destination. If so, at 1010, alerts may be generated and remediation may occur. In some exemplary embodiments, the decision to remediate may be automated, whereas in other exemplary embodiments the decision rests with a user that has access to the cumulative score and any alerts or other flags.

Figure 11:
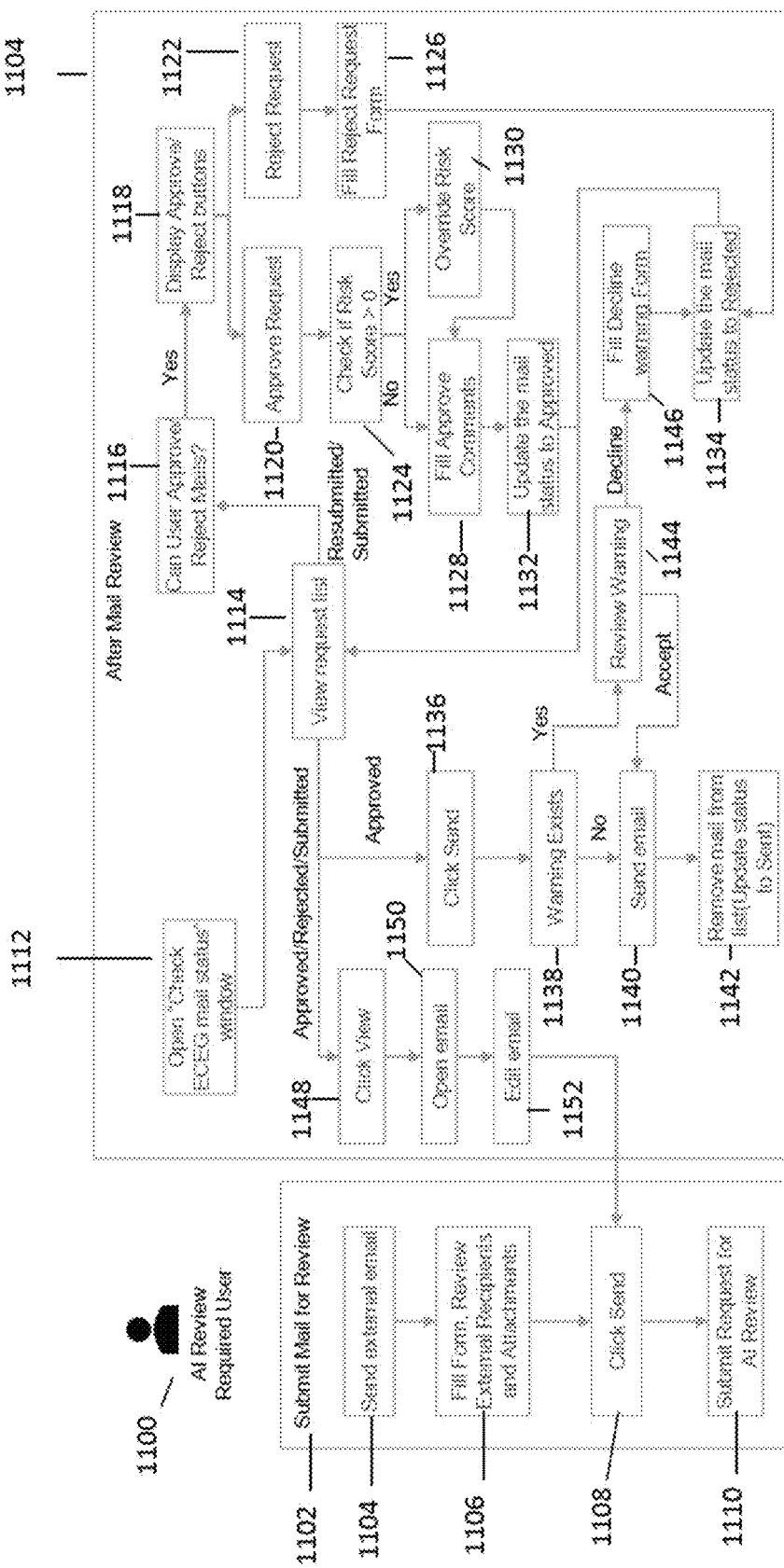
FIG. 11 depicts a diagram of the interaction between a party that originates an outbound email that is to be checked for IDD risk and a reviewer in an exemplary embodiment.

FIG. 11 depicts a diagram of the interaction between a sender that originates an outbound email that is to be checked for IDD risk and a reviewer in an exemplary embodiment. The sender of the outbound email 1100 submits an email for review at 1102. This entails send an external email (i.e., an outbound email) at 1104. The sender 1100 may be required to complete a form to initiate the review at 1106. The form may be accesses via an artificial intelligence plugin to the email program as mentioned above. At 1108, the sender may click send to send the email, and at 1110, the email is submitted for review by a reviewer. The outbound email may be processed as discussed above, and the results of the processing as well as the outbound email may be sent to a reviewer for review. The reviewer, at 1112, may open a mail status review window.

Figure 12:
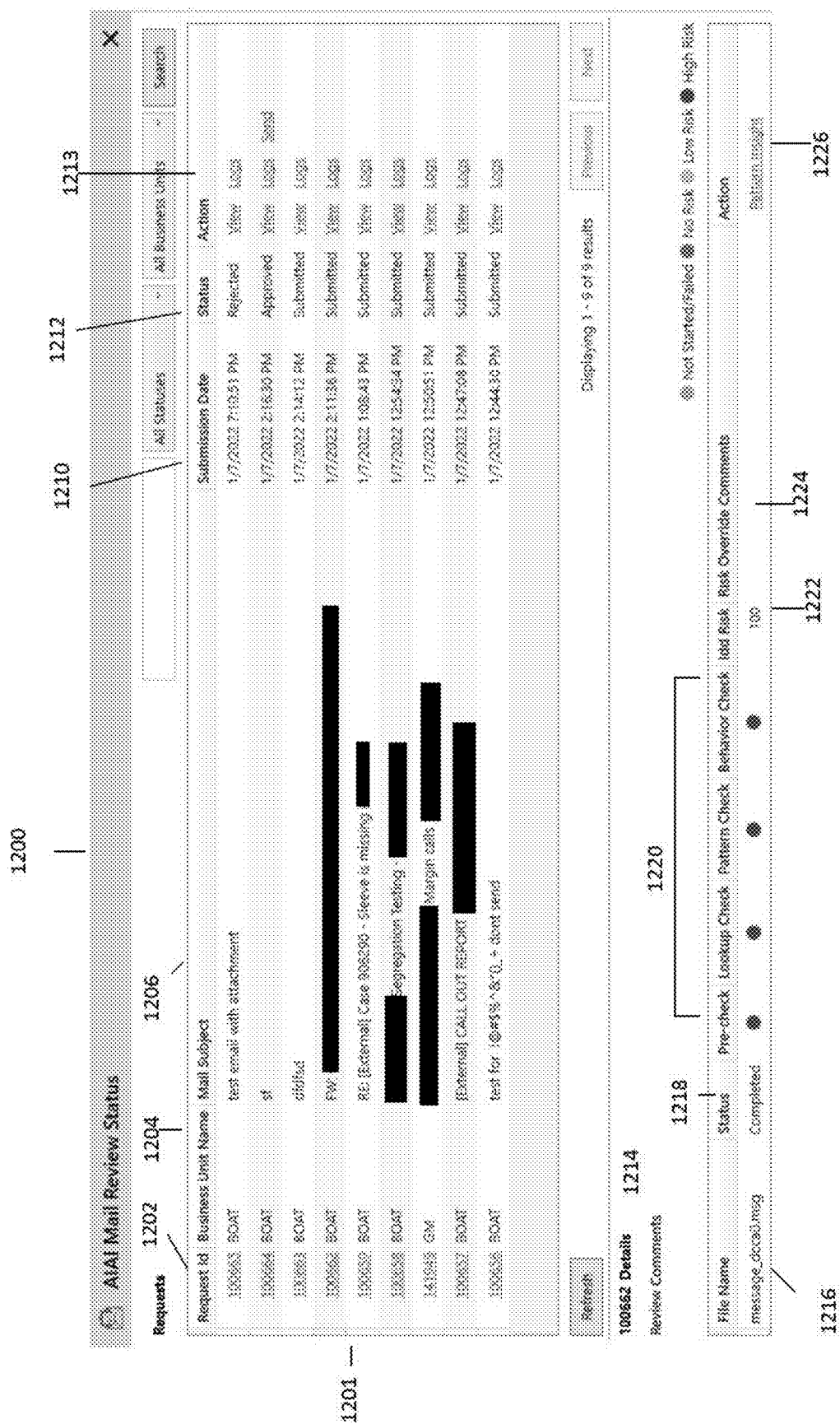
FIG. 12 depicts an example of illustrative mail status review window.

FIG. 12 depicts an example of illustrative mail status review window. The mail status window 1200 may be accessible via the IDD risk detector when a party logins as a reviewer. The mail status review window 1200 may display a list of outbound emails 1201 that are assigned to review by the reviewer. The list 1201 includes a row for each outbound email to be reviewed hold several field of information. Each 1202 row specifies a request ID for the review request and a business unit name 1204 from which the outbound email originates. The subject line 1206 is listed for each outbound for review. The submission date 1210 is listed, and the status 1212 of the review is listed. As can be seen, the status possibilities include rejected, approved and submitted. Other status options are possible as well. An action filed 1313 includes links to view the outbound email, to access logs for the outbound email or to send the outbound email. FIG. 12 also show more detail regarding a request in area 1214 of the window. The file name 1216 of the outbound email is listed as the status of the processing 1218. Colored dots in section 1220 indicate the results of the various checks performed in the processing. An IDD risk score 1222 (e.g., a cumulative score) is listed. Risk override comments 1224 may be provided by the reviewer when overriding and an action field may enable actions. In this example, there is a link to pattern insights link, which enables access to a pattern insight like that shown in FIG. 8C.

After the reviewer views the request list, a check is made whether the reviewer can approve or reject emails at 1116. The approve and reject user interface elements, such as buttons or links, may be displayed at 1118. The review may select the user interface elements to either approve the outbound email request to send at 1120 or reject the outbound email request at 1122. If the reviewer approves the request, a check is made whether the IDD risk score exceeds a threshold, such as 0, at 1124. If the risk score exceeds the threshold, at 1130, the risk score is overridden. If the risk score does not, at 1128, a user interface element may be displayed for comments, and the reviewer may use the user interface element to provide approval comments. At 1132, the status of the outbound email is updated to "Approved." If the reviewer, rejects the request at 1122, the user will be prompted to complete a reject request form that explains the rejection at 1126. In that case, at 1134, the status of outbound email is updated to rejected.

If the reviewer is viewing the request list and an outbound email has been approved, at 1136, the reviewer may select a user interface element to send the outbound email. If a warning exists regarding the outbound email, at 1144, the reviewer may review the warning at 1144 and decline to heed the warning at 1146, such as by completing a decline warning form. As a result, the status of the outbound email is changed to "Rejected" at 1134. If the reviewer accepts the warning, the email is sent at 1140, and the outbound email is removed from the request list at 1142. If the outbound email is "Approved," "Rejected," or "Submitted," the reviewer may select to view the outbound email at 1148, open the email at 1150, and edit the email.

As mentioned above, the reviewer may send the outbound email back to the sender or another party at the business unit of the sender for remediation along with information identifying the issues that were identified. The sender may delete the email and not send. Preferably, the sender reviews the issues with the email and sends it again for review.

While exemplary embodiments have been described herein, it should be appreciated that various changes in form and detail may be made to those exemplary embodiments without departing from the intended scope of the appended claims.

The invention claimed is:

1. A method performed by a processor of a computing device, comprising:
   processing an outbound email message from a sender in an organization with the processor to determine if the outbound email message is likely to result in an inadvertent data disclosure if sent, the processing comprising:
      applying a set of rules to the outbound email message with a rules-based engine to see if the outbound email message breaks or follows rules in the set of rules, and generating a first score indicative of whether that the outbound email message will result in an inadvertent data disclosure;
      comparing the outbound email with historical patterns of components of previously sent outbound emails from the organization to determine how well the outbound email message conforms with the historical patterns and generating a second score indicative of whether that the outbound email message will result in an inadvertent data disclosure, wherein the comparing comprises applying a multi-hierarchical clustering model to calculate similarity of the outbound email message at multiple layers with the previously sent outbound emails to determine whether the outbound email message is likely to result in the inadvertent data disclosure if sent;
      performing behavioral checks on the outbound email message with an artificial intelligence model to see if the outbound email message is likely to result in an inadvertent data disclosure if sent and generating a third score indicative of whether that the outbound email message will result in an inadvertent data disclosure;
   determining if the outbound email message is likely to result in an inadvertent data disclosure if sent based on based on a cumulative score calculated from the first score, the second score, and the third score; and
   where it is determined that the outbound email message is likely to result in an inadvertent data disclosure if sent, triggering at least one remediating action.

2. The method of claim 1, wherein the at least one remediating action comprises at least one of blocking the outbound email message from being sent, making the outbound email message accessible by a reviewer, generating a notification or alert, informing the sender that the outbound email message likely will result in an inadvertent data disclosure if sent, or modifying the outbound email message to eliminate or reduce the inadvertent data disclosure.

3. The method of claim 1, further comprising:
   where it is determined that the outbound email message is not likely to result in an inadvertent data disclosure if sent, allowing the outbound email message to be sent.

4. The method of claim 1, further comprising training the multi-hierarchical clustering model on historical outbound emails sent from the organization that did not result in inadvertent data disclosure when sent.

5. The method of claim 1, wherein the set of rules include at least one of:
- a rule requiring that any attachment for the outbound email message be encrypted,
- a rule prohibiting certain types of attachments for the outbound email message,
- a rule requiring that recipients identified in the outbound email message appear on a whitelist of approved recipients,
- a rule requiring that the outbound email message not include any sensitive terms, or
- a rule requiring that the recipients are not from multiple organizations.

6. The method of claim 1, wherein the performing of behavioral checks on the outbound email message with the artificial intelligence model identifies characteristics of the outbound email message that are anomalies relative to normal characteristics of historical outbound messages.

7. The method of claim 1, wherein an email program includes a plugin and wherein the processing of the outbound message is initiated via the plugin.

8. A non-transitory computer-readable storage medium storing programming instructions for execution by a processor to cause the processor to:
- process an outbound email message from a sender in an organization with the processor to determine if the outbound email message is likely to result in an inadvertent data disclosure if sent, the processing comprising:
  - applying a set of rules to the outbound email message via a rules-based engine to see if the outbound email message breaks or follows rules in the set of rules and based on the applying of the rules, generating a first score indicative of whether that the outbound email message will result in an inadvertent data disclosure;
  - comparing the outbound email with historical patterns of components of previously sent outbound emails from the organization to determine how well the outbound email message conforms with the historical patterns and based on the comparing, generating a second score indicative of whether that the outbound email message will result in an inadvertent data disclosure;
  - performing behavioral checks on the outbound email message with an artificial intelligence model to see if the outbound email message is likely to result in an inadvertent data disclosure if sent and based on the performing of the behavioral checks, generating a third score indicative of whether that the outbound email message will result in an inadvertent data disclosure;
  - determining if the outbound email message is likely to result in an inadvertent data disclosure if sent based on a cumulative score calculated from the first score, the second score, and the third score; and
  - where it is determined that the outbound email message is likely to result in an inadvertent data disclosure if sent, trigger at least one remediating action.

9. The non-transitory computer-readable storage medium of claim 8, wherein the at least one remediating action comprises at least one of blocking the outbound email message from being sent, making the outbound email message accessible by a reviewer, generating a notification or alert, informing the sender that the outbound email message likely will result in an inadvertent data disclosure if sent, or modifying the outbound email message to eliminate or reduce the inadvertent data disclosure.

10. The non-transitory computer-readable storage medium of claim 8, storing further programming instructions for execution by the processor to cause the processor to:
- where it is determined that the outbound email message is not likely to result in an inadvertent data disclosure if sent, allow the outbound email message to be sent.

11. The non-transitory computer-readable storage medium of claim 8, wherein the comparing of the outbound email with historical patterns of components of previously sent outbound emails from the organization comprises uses a multi-hierarchical clustering model in the comparing.

12. The non-transitory computer-readable storage medium of claim 11, storing further programming instructions for execution by the processor to cause the processor to train the multi-hierarchical clustering model on historical outbound emails sent from the organization that did not result in inadvertent data disclosure when sent.

13. The non-transitory computer-readable storage medium of claim 8, wherein the set of rules include at least one of:
- a rule requiring that any attachment for the outbound email message be encrypted,
- a rule prohibiting certain types of attachments for the outbound email message,
- a rule requiring that recipients identified in the outbound email message appear on a whitelist of approved recipients,
- a rule requiring that the outbound email message not include any sensitive terms, or
- a rule requiring that the recipients are not from multiple organizations.

14. The non-transitory computer-readable storage medium of claim 8, wherein the performing of the behavioral checks on the outbound email message with the artificial intelligence model identifies characteristics of the outbound email message that are anomalies relative to normal characteristics of historical outbound messages.

15. The non-transitory computer-readable storage medium of claim 8, wherein the programming instructions include a plugin for an email program and wherein when the plugin is executed by the processor, the processing of the outbound email message is initiated.

16. A computing device, comprising:
- a non-transitory computer-readable storage media storing computer programming instructions;
- a processor configured for executing the computer programming instructions to cause the processor to:
  - process an outbound email message from a sender in an organization with the processor to determine if the outbound email message is likely to result in an inadvertent data disclosure if sent, the processing comprising:
    - apply a set of rules to the outbound email message via a rules-based on engine to see if the outbound email message breaks or follows rules in the set of rules and generate a first score indicative of whether that the outbound email message will result in an inadvertent data disclosure;
    - compare the outbound email with historical patterns of components of previously sent outbound emails from the organization to determine how well the outbound email message conforms with the historical patterns and generate a second score indicative of whether that the outbound email message will result in an inadvertent data disclosure, wherein the comparing comprises applying a multi-hierarchical clustering model to calculate similarity of the outbound email message at multiple layers with the previously sent outbound emails to determine whether the outbound email message is likely to result in the inadvertent data disclosure if sent;

perform behavioral checks on the outbound email message with an artificial intelligence model to see if the outbound email message is likely to result in an inadvertent data disclosure if sent and generate a third score indicative of whether that the outbound email message will result in an inadvertent data disclosure;

determine if the outbound email message is likely to result in an inadvertent data disclosure if sent based on a cumulative score calculated from the first score, the second score, and the third score; and where it is determined that the outbound email message is likely to result in an inadvertent data disclosure if sent, trigger at least one remediating action.

17. The computing device of claim 16, wherein the at least one remediating action comprises at least one of blocking the outbound email message from being sent, making the outbound email message accessible by a reviewer, generating a notification or alert, informing the sender that the outbound email message likely will result in an inadvertent data disclosure if sent, or modifying the outbound email message to eliminate or reduce the inadvertent data disclosure.

18. The computing device of claim 16, wherein the computer programming instructions further cause to the processor to:

allow the outbound email message to be sent where it is determined that the outbound email message is not likely to result in an inadvertent data disclosure if sent.

\* \* \* \* \*